United States Patent [19]

Ott

[11] Patent Number: 4,959,505
[45] Date of Patent: Sep. 25, 1990

[54] ELECTRICAL COMPONENT IN CHIP STRUCTURE AND METHOD FOR THE MANUFACTURE THEREOF

[75] Inventor: Guenter Ott, Schwanberg, Austria

[73] Assignee: Siemens Aktiengesellschaft, Berlin and Munich, Fed. Rep. of Germany

[21] Appl. No.: 302,682

[22] Filed: Jan. 27, 1989

[30] Foreign Application Priority Data

Feb. 10, 1988 [DE] Fed. Rep. of Germany ....... 3804064

[51] Int. Cl.⁵ .......................... H01G 1/14; H01C 1/14
[52] U.S. Cl. ..................................... 174/52.2; 29/856; 338/324; 361/306; 361/405
[58] Field of Search ............... 174/52.2; 361/306, 308, 361/309, 310, 405; 338/275, 276, 322, 324; 29/619, 621, 825, 841, 854, 856

[56] References Cited

U.S. PATENT DOCUMENTS

| 4,497,012 | 1/1985 | Gottlieb et al. | 361/306 |
| 4,578,737 | 3/1986 | Westermann | 361/308 |
| 4,617,609 | 10/1986 | Utner | 361/310 |

FOREIGN PATENT DOCUMENTS

| 162149 | 11/1985 | European Pat. Off. | |
| 171838 | 2/1986 | European Pat. Off. | 174/52.2 |
| 229286 | 7/1987 | European Pat. Off. | |
| 130386 | 9/1987 | European Pat. Off. | |
| 1064127 | 8/1959 | Fed. Rep. of Germany | |
| 1564692 | 11/1970 | Fed. Rep. of Germany | |
| 3412492 | 10/1985 | Fed. Rep. of Germany | |
| WO85/00463 | 1/1985 | World Int. Prop. O. | |

*Primary Examiner*—Gerald P. Tolin
*Assistant Examiner*—David A. Tone
*Attorney, Agent, or Firm*—Hill, Van Santen, Steadman & Simpson

[57] ABSTRACT

At two large opposite end faces a component composed of a wafer-shaped or lamina-shaped body (1) has coatings (2, 3) and ribbon-shaped terminal elements (5, 6) and is pressure-coated with a lamina-shaped or cuboid insulating coat (7). The terminal elements (5, 6) of the component are conducted toward the outside through the insulating coat (7) at the level of the end faces of the body (1) without being bent off, the upper terminal element (5) is bent off in a downward direction and is then bent over onto the underside (19) of the insulating coat, and the lower terminal element (6) is first bent off in an upward direction, and is then arranged at the surface of the insulating coat (7) at the level of the exit location of the first terminal element (5), is then bent over by 180° at this level and, lying against the terminal element (6), is bent down under the underside (19) of the insulating coat (7).

4 Claims, 2 Drawing Sheets

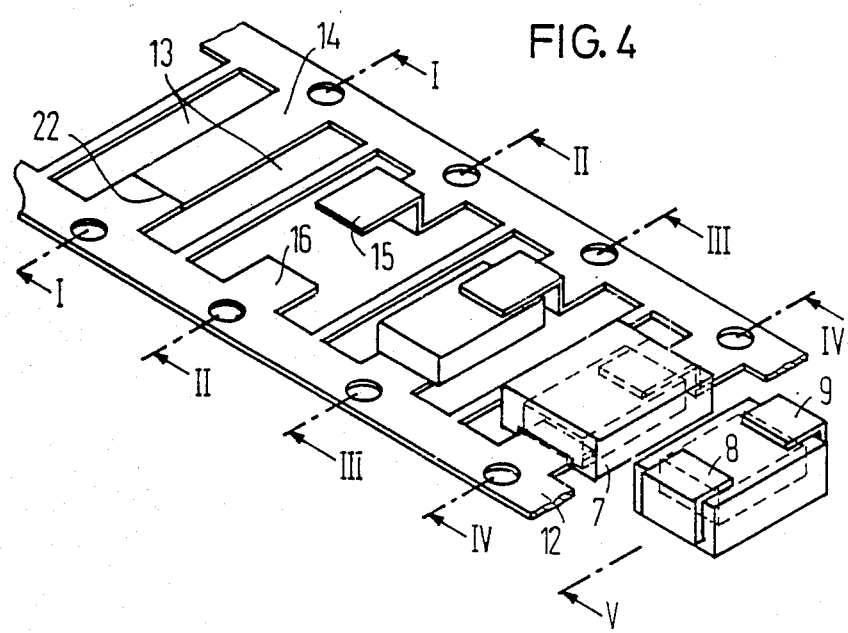
FIG. 4
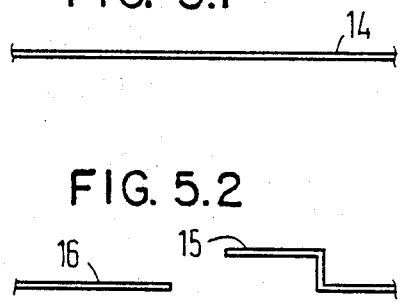
FIG. 5.1
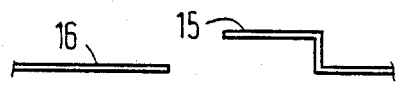
FIG. 5.2
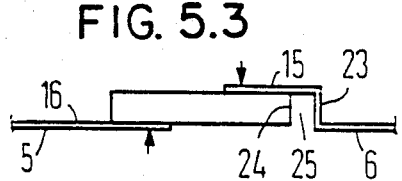
FIG. 5.3
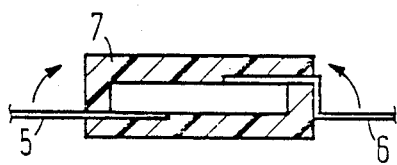
FIG. 5.4
FIG. 5.5
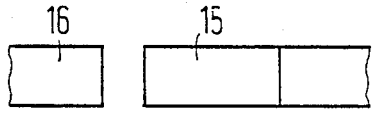
FIG. 6A
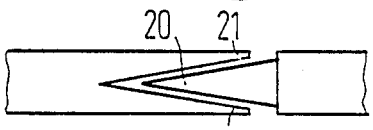
FIG. 6B
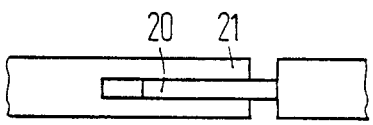
FIG. 6C
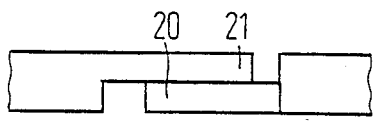
FIG. 6D

ELECTRICAL COMPONENT IN CHIP STRUCTURE AND METHOD FOR THE MANUFACTURE THEREOF

BACKGROUND OF THE INVENTION

The invention is directed to an electrical component in the form of a chip structure for fastening to a circuit board. The component is composed of a wafer-shaped or lamina-shaped member that is provided with conductive coatings at its large end faces lying opposite one another, and has ribbon-shaped terminal elements for connecting the coatings of opposite polarity to contact locations of a printed circuit situated on the circuit board and that is extrusion-coated with a lamina-shaped or cuboid insulating coat.

Such components are disclosed, for example, by EP-A Ser. No. 229 286 published July 22, 1987.

The invention is also directed to a method for the manufacture of such an electrical component wherein a metal band is first provided with recesses such that conductor webs or ridges are formed, the component members are subsequently inserted between the conductor webs or ridges, connected to the parts of the conductor webs or ridges and provided with an insulating coat.

Such a method is disclosed by EP-A Ser. No. 162 149 published Nov. 27, 1985.

Efforts to accommodate a greater and greater plurality of discrete components on a surface of constant size have led to smaller and smaller housing shapes. The smallest housing shape at present is that of the surface-mounted devices (SMD) that are also referred to as chip components.

Soldering surface-mountable components onto printed circuit boards can be accomplished via various methods. Advantageous methods therefor are immersion soldering, or what is referred to as flow soldering wherein the surfacemounted devices are briefly conducted over a wave of molten soldering tin. This requires the employment of highly heat-resistant materials for the insulation envelope such as, for example, thermoplastics. Until they are secured by soldering, the components are temporarily retained at the circuit board, for example by gluing, with clamps or by pinching into appropriate openings, as disclosed, for example, in DE-AS Ser. No. 1 064 127.

In particular, electrical components within the scope of the present invention are electrical resistors having a value of resistance that is dependent on the applied voltage (varistors), resistors having a value of resistance dependent on the temperature (posistors=PTC resistors or thermistors=NTC resistors), or electrical capacitors having a ceramic or plastic dielectric, whereby all of these components can be executed as cylindrical or cuboid members or as members composed of layers having coatings inserted therebetween. All of these components are disclosed, for example, in the afore-mentioned EP-A Ser. No. 229 286.

In the manufacture of the said components, metal coatings are usually applied to two opposite, large end faces of the member, the terminal elements then being secured to these metal coatings. Subsequently, the component body is provided with an insulating coat preferably of thermoplastic or duroplastic, heat-resistant plastic, for example by compression molding, so that the outer parts of the terminal elements emerge from the insulating coat. The plastic may be potentially filled with insulating coat. The plastic may be potentially filled with mineral or other fillers in a known way.

The present invention can be employed in all components of the type under discussion here, insofar as the components are provided with terminal elements at the opposite, large end faces of the member (surface-contacted), i.e. are not side-contacted.

The afore-mentioned, electrical components have been adequately described in numerous, further publications. The afore-mentioned EP-A Ser. No. 162 149, particularly FIG. 4 and the appertaining description therein, shall be referenced for the specific instance of electrical capacitors in chip structure that are nonetheless provided with power leads at the large, opposite end faces. European Patent EP-A Ser. No. 130 386 published Jan. 9, 1985, also discusses the problem in detail of how the terminal elements of a side-contacted plastic foil wound capacitor are to be conducted through the insulating envelope such and are to be subsequently bent over such at the surface of the envelope that this can be used as a chip component.

FIG. 2 in German Published Application Ser. No. 36 38 286.8, shows SMD varistors that are already commercially available within the framework of the Siemens Series SIOV-CU4032 and are thus Prior Art. FIG. 1 hereof corresponds to the said FIG. 2, and shows that ribbon-shaped terminal elements are provided with bent-off portions between the component body and surface of the insulating coat. Only after this are the terminal elements conducted toward the outside and bent over there to form solder surfaces. Given terminal elements brought directly to the surfaces in parallel (see FIG. 2), parts of unequal length arise at the surface elements of the insulating coat perpendicular to the surface of the circuit board. This leads to an asymmetrical solder moistening during the solder process and causes what is referred to as the tombstone effect that shall be set forth later with reference to the attached FIG. 2.

As may be seen from FIG. 1, the method of bending off the terminal elements within the insulating coat that was previously carried out in fact guarantees an adequate and symmetrical moistening of the outwardly residing contact locations with solder; however, a considerable spatial outlay is required therefor. The insulating requirement in and of itself would definitely not make the hitherto standard, lateral thicknesses of the insulating coat of the components necessary. In normal operation, one can assume about 2,000 V as the highest voltage load of the varistors under discussion here. On the other hand, the plastics that are employed can be loaded with about 40,000 V per mm. Given this insulating coat manufactured in a pressing process, a spatial outlay is exerted that can only be explained on the basis of the specific, spatial arrangement of the terminal elements.

SUMMARY OF THE INVENTION

The object of the present invention is to specify an electrical component in chip structure and a method for the manufacture thereof wherein the actively exploited volume of the component body practically corresponds to the overall volume of the component (body and coat) despite surface-contacting of the body of the component with ribbon-shaped terminal elements, that, thus, the outer dimensions of the electrical component are not essentially defined by the spatial configuration of the terminal elements.

For achieving this object, the electrical component of the species initially cited is inventively characterized by the features:

(a) the terminal elements planarly secured to the coatings are led to the outside through the insulating coat at the level of the end faces of the body without bendoff;

(b) outside of the insulating coat, that terminal element secured to the upperside of the body with reference to the circuit board is bent off in a downward direction, then conducted along the surface of the insulating coat and then bent off onto the underside thereof;

(c) outside of the insulating coat, that terminal element secured to the underside of the body is first bent off in an upward direction, then arranged at the surface of the insulating coat proceeding into the level of the exit location of the first terminal element bent over by 180° in this level and, lying against the terminal element, is likewise bent off under the underside of the insulating coat.

Compared to the Prior Art, the invention achieves not y a considerable reduction of the space needed for the insulating coat but also provides a further advantage that is comprised therein that the terminal elements are not bent off within the insulating coat and that the bending process for applying the terminal elements to the surface of the insulating coat proceeds in a considerably simpler way.

A preferred embodiment is characterized in that the part of the upper terminal element secured to the upper metal coat, and the part of the lower terminal element secured to the lower metal coat, overlap one another with reference to their length.

This embodiment guarantees that the component body is held even better until it is enveloped with insulator.

The method of the species initially recited for manufacturing such an electrical component is characterized by the following method steps for achieving the object of the invention:

(a) every second conductor web is divided into two parts and one part thereof is bent over out of the plane of the ribbon by 90° and is subsequently again bent in parallel to the plane of the ribbon;

(b) the body provided with the coatings is inserted such between the parts of the conductor webs shaped in such fashion that a free space remains between the vertically residing part of the conductor web part and the edge of the body, this space guaranteeing an adequate insulation between the coating and the terminal element in the enveloped component;

(c) the body provided with the coatings and those parts of the terminal elements proceeding parallel to the end faces are extrusion-coated with the insulating coat such that its outer surface coincides with the vertical part of the terminal element and the plastic of the insulating coat is simultaneously or subsequently cured;

(d) the terminal elements projecting vertically from the surface of the insulating coat are cut off in a length that is adequate in order to bend both terminal elements over proceeding along the surface of the insulating coat and extending down to the underside thereof.

This method is obviously easier to implement when compared to the Prior Art.

BRIEF DESCRIPTION OF THE DRAWINGS

The invention shall be set forth in greater detail below with reference to exemplary embodiments shown in the figures, in which:

FIGS. 4 and 5.1–5.5 show the method steps in the manufacture of a component of the invention;

FIG. 6A–6D show various possible embodiments for fashioning the terminal elements.

DESCRIPTION OF THE PREFERRED EMBODIMENT

Figure 1:
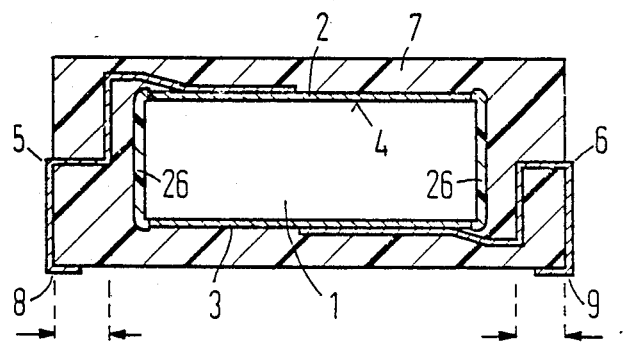
FIG. 1 shows an embodiment that is classified as Prior Art.

FIG. 1 shows a component that is executed as a surface-mounted device. The body 1 is provided with coatings 2 and 3 on both sides to which terminal elements 5 and 6 are soldered. The circumferential surface of the body 1 is covered with a polyimide envelope 26. The body 1 and the terminal elements 5 and 6 in part as well are enclosed by an insulating coat 7 of polyphenylene sulfide (PPS) that guarantees a high heat resistance during the later soldering. The parts of the terminal elements 5 and 6 projecting from the insulating coat 7 are bent over such that they form contact locations 8 and 9 as known and typical for surface-mounted devices. The terminal elements 5 and 6 proceeding in the insulating coat are lent the specific shape shown in the drawing by coining (double bending) before being soldered onto the coats 2 and 3 so that the terminal elements carry accumulations 10 and 11 (FIG. 3) of solder of identical size outside of the insulating coat. This shaping is space-wasting, as indicated by the arrows.

Figure 2:
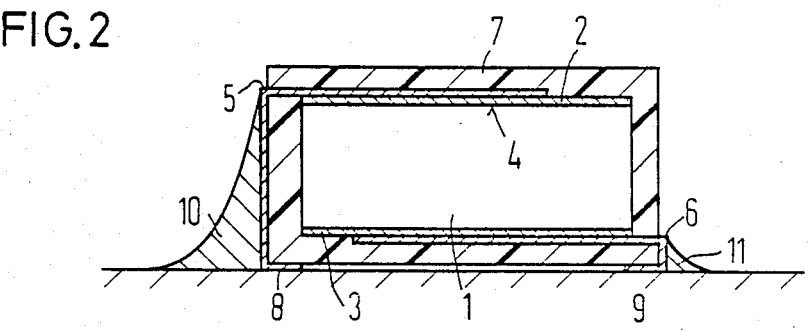
FIG. 2 shows a non-inventive embodiment comprising asymmetrical solder moistening.

FIG. 2 shows a component wherein the terminal elements 5 and 6 are conducted out of the insulating coat in the level of the body 1 without prior shaping by coining and are subsequently bent over onto the underside of this insulating coat. This in fact avoids a loss of space as in FIG. 1; however a highly asymmetrical solder moistening arises, as may be seen. This results in the so-called and known tombstone effect wherein buoyancy forces occur because of the asymmetrical solder moistening, pulling the contact location 9 up in this case so that the chip component lies like a slanting tombstone.

Figure 3:
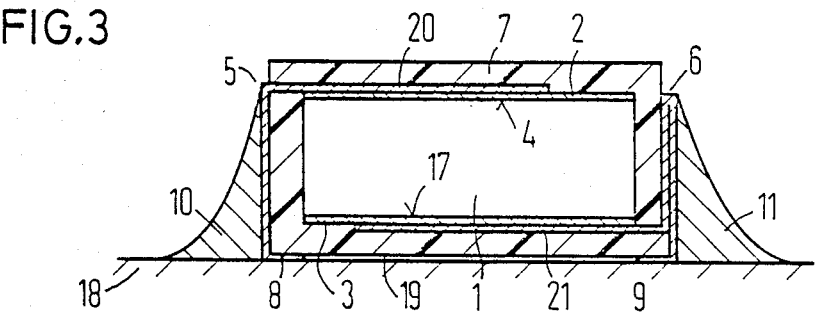
FIG. 3 shows an illustrative embodiment of the invention, showing execution of a component.

FIG. 3 shows an exemplary embodiment of the invention. The polyimide envelope 26 shown in FIG. 1 is not shown here because it is required only in special instances, for example given the employment of a plastic as envelope that emits substances injurious to the ceramic. The specific folding of the terminal element 6 secured to the underside of the body as shown in the drawing prevents, first, an unequal size of the contact locations 10 and 11 and, thus, prevents the tombstone effect. On the other hand, a considerable space-saving in comparison to the known embodiment in FIG. 1 derives. In technical practice, this means that the modified contact configuration allows the format of, for example, the varistor type CU4032 to be reduced to the next smallest grid dimension, for example from the grid dimension 7.5 mm to 5.0 mm.

FIGS. 4 and 5.1–5.5 show the manufacturing method. The respective manufacturing steps I through V are thereby shown in perspective in FIG. 4 of the drawing and are shown respectively in section in FIG. 5.1–5.5. A metal band 12 of flexible metal fire-tinned on both sides, particularly provided with tinlead solder and having a couch of about 4 through 8 per side is provided with recesses 13 such that the conductor webs 14 serving as terminal elements 5 and 6 remain joined to the metal band. Such metal bands and method steps are inherently known from semiconductor technology, particularly from IC Technology; they are also known from EP-A Ser. No. 162 149 that was already cited above.

Every second conductor web is divided and one part is bent over in accord with the shape of the component to be inserted.

During the course of the further method, the component bodies 1 together with coatings 2 and 3 are thrust between the parts 15 and 16 of the conductor webs.

In the next method step, the parts 15 and 16 are connected to the coatings 2 and 3 such that an empty space 25 remains between the vertically residing part 23 of the conductor web part 15 and the edge 24 of the body 1, this empty space 25, first, guaranteeing an adequate insulating spacing between the terminal element 6 and the antipolar coating 3 and, second being large enough so that insulating material can penetrate. In the next method step, an insulating coat 7 of plastic is generated around the component body 1 and the parts 15 and 16 of the conductor webs, the thickness of this insulating coat 7 expediently amounting only up to 1.5 mm, namely both in the region of the large end faces provided with the coatings 2, 3 as well as in the region of the circumferential surface of the body 1 where the space-saving is achieved by the invention. Manufacturing methods employable for this are adequately known, for example in the manufacture of coatings for semiconductor components and integrated circuits (IC) by extrusion-coating, pressure-coating and sinter-coating.

In the next method step, the electrical components provided with the insulating coat 7, preferably the varistors, are separated from the band so that individual bodies are present wherein the terminal elements 5 and 6 project from the insulating coat 7. These projecting parts are bent over proceeding along the surface of the insulating coat 7, so that at least the contact locations 8 and 9 arise.

FIGS. 6A–6D show various possibilities of dividing the conductor webs 14 in the two parts 15 and 16 that overlap one another in length tongue-like. Dependent on the embodiment of the component body, such shapes can be required in case the part 15 of the conductor web is no longer adequately long after the folding.

It will be understood that variations and modifications may be effected without departing from the spirit and scope of the novel concepts of the present invention.

It is claimed:

1. An electrical component in the form of a chip structure adapted for fastening to a circuit board, comprising a wafer-shaped or lamina-shaped body (1) of material having a predetermined electrical characteristic, said body being provided with conductive coatings (2, 3) at two large end faces that lie at opposite ends of said body, a pair of ribbon-shaped terminal elements (5, 6) for connecting said coatings (2, 3) to spaced-apart contact locations (8, 9) of said component to be situated on a printed circuit board (18), and said body being pressure-coated with a lamina-shaped or cuboid insulating coat (7), characterized in that (a) said terminal elements (5, 6) are planarly secured to the coatings (2, 3) and extend in first and second planes toward the outside of said component, through the insulating coat (7) approximately in the plane of said end faces of the body (1);

(b) outside of the insulating coat (7), that terminal element (5) which is secured to the upperside (4) of the body (1) relative to said circuit board (18) being bent off from said first plane in a downward direction, and then extending along the outer surface of said insulating coat (7) and is then bent over onto the underside (19) of said component;

(c) outside of said insulating coat (7), the terminal element (6) which is secured to the underside (17) of the body (1) is first bent off from said second plane in an upward direction, and then extends along the surface of the insulating coat (7) until it reaches approximately said first plane, and is then bent over by 180° in this level, end, lying against itself, is likewise bent over under the underside (19) of the insulating coat (7).

2. The electrical component according to claim 1, characterized in that the part (20) of the upper terminal element (5) which is secured to the upper conductive coating (2), and the part (21) of the lower terminal element (6) which is secured to the lower conductive coating (3) overlap each other.

3. A method of manufacture of an electrical component in the form of a chip structure adapted for fastening to a circuit board, comprising a wafer-shaped or lamina-shaped body (1) of material having a predetermined electrical characteristic, said body being provided with conductive coatings (2, 3) at two large end faces that lie at opposite ends of said body, a pair of ribbon-shaped terminal elements (5, 6) for connecting said coatings (2, 3) to spaced-apart contact locations of the component to enable mounting on a printed circuit situated on a printed circuit board (18), and said body being pressure-coated with a lamina-shaped or cuboid insulating coat (7), including the steps of providing a conductive planar ribbon (12) with recesses to define plural conductive webs (14), dividing the webs, inserting electrical bodies (1) into position between the divided parts of said webs (14), connecting said bodies to said webs and providing each of said bodies with a surrounding envelope (7), and further characterized by:

(a) dividing every second conductor web (22) into two parts (15, 16) and bending one part (15) thereof by 90° out of the plane of said ribbon to form an upstanding part, and subsequently bending it into a plane parallel to the plane of said ribbon (12);

(b) inserting said body (1) having conductive coatings (2, 3) between the divided parts (15, 16) of the conductor webs (22) shaped so that a free space (25) remains between said upstanding part (23) of the conductor web part (15) and the nearest edge (24) of the body (1), this free space (25) providing an insulating spaced between the coating (2) and the terminal element (6) in the enveloped component;

(c) pressure coating said body (1) having the coatings (2, 3) and pressure coating the parts (15, 16) of the terminal elements (5, 6) which proceed parallel to the end faces with an insulating envelope (7) so that the outer surface of said envelope coincides with said upstanding part (23) of the terminal element (6), and curing the material of said insulating envelope (7); and cutting off the terminal elements (5, 6) projecting vertically from the surface of said insulating envelope (7) at a length that is adequate to allow bending of both terminal elements (5, 6) over at the surface of said insulating envelope (7) and extending down to the underside (19) thereof.

4. The method of manufacturing an electrical component according to claim 3, including the step of dividing alternate ones of said webs (22) into two parts (20, 21) to form said two parts (20, 21) into the form of engaging tongues.

* * * * *